United States Patent [19]

Yasuoka et al.

[11] Patent Number: 5,447,894
[45] Date of Patent: Sep. 5, 1995

[54] SINTERED CERAMIC ARTICLE FORMED MAINLY OF ALUMINA

[75] Inventors: Masaki Yasuoka; Kiyoshi Hirao, both of Nagoya; Shuzo Kanzaki, Kasugai, all of Japan

[73] Assignees: Agency of Industrial Science & Technology; Ministry of International Trade & Industry, both of Tokyo, Japan

[21] Appl. No.: 354,123

[22] Filed: Dec. 6, 1994

[30] Foreign Application Priority Data

Dec. 24, 1993 [JP] Japan ................................. 5-347611

[51] Int. Cl.$^6$ ............................................. C04B 35/10
[52] U.S. Cl. .................................... 501/152; 501/128; 501/153; 501/154; 264/66
[58] Field of Search .................. 501/73, 127, 128, 152, 501/153, 154; 264/65, 66

[56] References Cited

U.S. PATENT DOCUMENTS

| | | | |
|---|---|---|---|
| 3,792,142 | 2/1974 | Kobayashi et al. | 501/127 |
| 4,178,187 | 12/1979 | Huseby et al. | 501/152 |
| 5,081,082 | 1/1992 | Hai-Doo et al. | 501/153 |

FOREIGN PATENT DOCUMENTS

| | | |
|---|---|---|
| 494362 | 7/1992 | European Pat. Off. |
| 60-238146 | 11/1985 | Japan |
| 04238861 | 8/1992 | Japan |
| 9306058 | 4/1993 | WIPO |

OTHER PUBLICATIONS

Yamaguchi et al. "New Compound in the System LA$_2$O$_3$—Al$_2$O$_3$", J. Am. Ceram. Soc. 68[2] C44–C45, 1985.

Chemical Abstracts, vol. 121, No. 6, 8 Aug. 1994, Columbus, Ohio, US; abstract No. 63565a, Kang, et al., "Formation of La-Beta-Aluminain Alpha-Alumina Matrices, and its Effect on the Mechanical Properties" col. R & Yoop Hakhoechi, vol. 29, No. 1, 1992, Korea, pp. 23–28.

Chemical Abstracts, vol. 107, No. 16, 19 Oct. 1987, Columbus, Ohio, US; abstract No. 139358u, Takahata et al. "Preparation and Mechanical Properties of Lanthanum-Beta-Alumina Composites", p. 323; col. L; & Toyo Soda Kenkyu Hokoku, vol. 31, No. 2, 1987, Japan, pp. 73–80.

Materials Science and Engineering, vol. 71, 1985, pp. 23–38, Nils Claussen, "Strengthening Strageties for ZrO2-Toughened Ceramics at High Temperatures" no month.

J. Am. Ceram. Soc., vol. 75, No. 9, pp. 2610–2612, 1992, Pei-Lin Chen, et al., "In-Situ Alumina/Aluminate Platelet Composites" no month.

Journal of Materials Science, vol. 28, 1993, pp. 5953–5956, T. Koyama, et al., "Effect of a Small Amount of Liquid-Forming Additives on the Microstructure of Al2O3 Ceramics" no month.

Communications of the American Ceramic Society, Dec. 1984, Paul F. Becher, et al., "Toughening Behavior in SiC-Whisker-Reinforced Alumina", pp. C-267-C-269.

*Primary Examiner*—Mark L. Bell
*Assistant Examiner*—Michael Marcheschi
*Attorney, Agent, or Firm*—Oblon, Spivak, McClelland, Maier & Neustadt

[57] ABSTRACT

A sintered ceramic article formed mainly of alumina, having a chemical composition of from 1 to 10% by weight of La$_2$O$_3$, from 0.01 to 0.1% by weight of SiO$_2$, and the balance of Al$_2$O$_3$ and containing these components in the form of corundum ($\alpha$-Al$_2$O$_3$) and lanthanum $\beta$-alumina (La$_2$O$_3$.11Al$_2$O$_3$) and a method for the production of a sintered ceramic article formed mainly of alumina, comprising the steps of shaping a mixture of Al$_2$O$_3$, La$_2$O$_3$, and SiO$_2$, calcining the shaped mixture in the air at a temperature in the range of from 600° C. to 1000° C., and further firing the calcined shaped mixture to a temperature in the range of from 1400° C. to 1800° C.

9 Claims, No Drawings

SINTERED CERAMIC ARTICLE FORMED MAINLY OF ALUMINA

BACKGROUND OF THE INVENTION

1. Field of the Invention

This invention relates to a sintered ceramic article formed mainly of alumina and characterized by exhibiting both high strength and high toughness at normal room temperature and elevated temperatures (1200° C.) and a method for the production of the sintered ceramic article.

2. Description of the Prior Art

Alumina has a high melting point, is thermally stabile, and excels in resistance to abrasion, insulation property, and resistance to corrosion and, on account of these features, has found extensive utility as an industrial material. For example, the high electric insulating property of alumina is utilized in electronic components such as spark plugs, IC substrates, and packages as well as in light-pervious alumina, bioceram and other such highly functional sintered articles and single-crystal materials. Practical application of alumina as a functional material has thus been extended into a wide range of fields. Application of alumina as a structural material, however, has been slower. This can be traced to the low toughness of alumina, which is in the range of 3 to 4 MPam$^{\frac{1}{2}}$. In terms of resistance to oxidation and corrosion, however, alumina is fundamentally superior to such non-oxide ceramic materials as silicon nitride and silicon carbide which are the main ceramic structural materials in use today. It is therefore regarded as a potentially excellent structural material. Moreover, alumina can be fired in the open air, whereas the non-oxide ceramic materials are required to be fired nitrogen, argon or other such non-oxidizing gas atmosphere. A plant for the production of sintered alumina articles is therefore not very expensive to construct. Further, it can be operated at a low running cost.

Various methods have been studied for improving the toughness of alumina. These methods can be roughly divided into the four types: (1) dispersion of $ZrO_2$, (2) dispersion of platelike particles or whiskers, (3) growth of platelike alumina particles by the addition of a liquid phase forming auxiliary, and (4) the growth of platelike particles as $La_2O_3 \cdot 11Al_2O_3$ (hereinafter referred to briefly as "$LaAl_{11}O_{18}$") in a coexistent relationship with alumina. The method of (1) consists in utilizing the stress-induced modification of zirconia. It is reported that the alumina produced by this method possesses a high fracture toughness in the range of from 5 to 8 MPam$^{\frac{1}{2}}$. Since the mechanism for increasing toughness utilizes the phase modification of zirconia, high toughness can be obtained by this mechanism only at temperatures not exceeding the temperature of the monoclinic system-tetragonal system modification of zirconia (400° to 800° C.).

The method of (2) consists in dispersing in alumina from 10 to 30% by volume, based on alumina, of whiskers or platelike particles of a non-oxide material with form anisotropy such as silicon carbide or silicon nitride. The toughness of alumina is enhanced by causing the dispersed whiskers or platelike particles to produce a bridging or a fiber extracting effect along edges of cracks produced by grain boundary breaking. As reported in J. Am. Ceram. Soc., 67 [12], C267–C269 (1984), this method produces a sintered article with a high fracture toughness on the order of 8.7 MPam$^{\frac{1}{2}}$. On the other hand, however, the strength of the sintered article is reduced because the added platelike particles or whiskers function as faults. Besides, since the method requires a large amount of these platelike particles or whiskers to be dispersed, namely as much as 10 to 30% by volume based on alumina, the reinforced alumina must be fired by hot pressing or hot isotactic pressing (HIP). This method is therefore very expensive and is hard to apply for obtaining a sintered article of complicated shape. Further, since a non-oxide ceramic material such as silicon carbide or silicon nitride is used as a dispersing material, it is likely that the reinforced alumina will deteriorate and lose its fortified toughness by oxidation at elevated temperatures and that the product of this method will not endure protracted use either at elevated temperatures or in a corrosive environment. The method of (3), as reported in Mater. Sci., 28, 5953–56 (1993), for example, consists in using silica-calcia, silica-magnesia or other such firing material which reacts with alumina in the firing temperature range and forms a liquid phase, thereby enabling the alumina particles to grow during firing into plates of high anisotropy and consequently increasing the toughness by a mechanism similar to that obtained by the addition of platelike particles. This method, however, has the disadvantage that the sintered article experiences a marked decrease in strength at high temperatures because a low-melting-point vitreous phase persists in the sinter. The method of (4) consists in causing platelike hexaaluminate particles (such as $LaAl_{11}O_{18}$ and $LaMgAl_{11}O_{18}$) to grow in an alumina matrix during sintering. The product of this method suffers only a slight decline of mechanical properties because no low-melting-point vitreous phase persists in the sinter. As reported in J. Am. Ceram. Soc., 75 [9], 2610–12 (1992), the fracture toughness of this product is about 4 MPam$^{\frac{1}{2}}$. Thus, this method gives only a small increase in toughness.

From the foregoing it is obvious that the prior art methods are incapable of producing a sintered alumina article having both high strength and high toughness at temperatures ranging from normal room temperature to elevated temperatures under various circumstances including corrosive environments.

An object of this invention is to provide a sintered article formed mainly of alumina which exhibits high strength and high toughness at temperatures ranging from room temperature to elevated temperatures or in corrosive environments and which enables easy fabrication of products even in complicated shapes by a simple process at a low cost.

Another object of the invention is to provide a method for the production of the sintered article.

SUMMARY OF THE INVENTION

The inventors noted that $LaAl_{11}O_{18}$ has excellent resistance to heat and, when incorporated in an aluminum matrix and sintered, grows in the form of platelike particles. Based on this finding, they made a study with a view to developing a method for utilizing $LaAl_{11}O_{18}$ to produce a sintered article formed mainly of alumina and exhibiting enhanced toughness. In the early stage of their study, they found that a sintered article obtained by firing a shaped piece of a mixture of $Al_2O_3$ with $La_2O_3$ shows no substantial improvement in toughness because the alumina particles constituting the matrix assume an isometric form, whereas the compound $LaAl_{11}O_{18}$ formed by the reaction of the starting raw materials grows in the form of platelike particles. They continued their study of this system based on this knowledge and consequently found that addition of a very small amount of silica allows the $LaAl_{11}O_{18}$ to retain its platelike particle form and, at the same time, enables the alumina constituting the matrix to assume the form of platelike particles and, owing to the combined particle-forming effects of the two compounds, enables production of a material having higher toughness than the conventional $Al_2O_3$-$LaAl_{11}O_{18}$ type material. They further found that this addition of a very small amount of silica has virtually no adverse effect on the high-temperature strength of the sintered article produced.

To be specific, this invention concerns a sintered ceramic article formed mainly of alumina, having a chemical composition of from 1 to 10% by weight of $La_2O_3$, from 0.01 to 0.1% by weight of $SiO_2$, and the balance of $Al_2O_3$, and substantially comprising corundum ($\alpha$-$Al_2O_3$) and lanthanum $\beta$-alumina ($La_2O_3 \cdot 11Al_2O_3$), and a method for the production of the sintered ceramic article formed mainly of alumina by shaping a mixture of $Al_2O_3$, $La_2O_3$, and $SiO_2$, calcining the shaped mixture in the air at a temperature in the range of from 600° C. to 1000° C., and further firing the calcined shaped mixture to a temperature in the range of from 1400° C. to 1800° C.

DESCRIPTION OF THE PREFERRED EMBODIMENTS

The sintered ceramic article of this invention is also characterized by being densified to a relative density of not less than 97%.

Specifically, this invention pertains to a method for the production of a sintered alumina-based ceramic article characterized by shaping a mixture having a chemical composition of from 1 to 10% by weight of $La_2O_3$, from 0.01 to 0.1% by weight of $SiO_2$, and the balance of $Al_2O_3$ and subsequently firing the shaped mixture at a temperature in the range of from 1400° C. to 1800° C. thereby densifying the texture thereof to a relative density of not less than 97% and a sintered alumina-based ceramic article characterized in that its crystal phase comprises corundum (-$Al_2O_3$) and lanthanum $\beta$-alumina ($La_2O_3 \cdot 11Al_2O_3$).

As the first step in the production of the sintered article formed mainly of alumina according to this invention, a mixture having a chemical composition of from 1 to 10% by weight of $La_2O_3$, from 0.01 to 0.1% by weight of $SiO_2$, and the balance of $Al_2O_3$ is prepared.

The $La_2O_3$ content of this mixture is in the range of from 1 to 10% by weight, preferably from 3 to 7% by weight. If the content is less than 1% by weight, the sintered article produced will acquire a low fracture toughness of not more than 5 MPam$^{\frac{1}{2}}$ because the platelike particles of $LaAl_{11}O_{18}$ are produced in only a small amount. Conversely, if the content exceeds 10% by weight, the sintered article produced will have low strength because the formed $LaAl_{11}O_{18}$ will account for not less than 40% of the sintered article by volume, the sintering will occur among the adjacent $LaAl_{11}O_{18}$ particles, and the sintered article produced will acquire properties which approximate those of $LaAl_{11}O_{18}$. It is, therefore, important to confine the content within the range specified above.

The silica content of the mixture is in the range of from 0.01 to 0.1% by weight, preferably from 0.02 to 0.08% by weight. If the content is less than 0.01% by weight, the sintered article produced will have low fracture toughness because the alumina constituting the matrix will fail to attain full growth into platelike particles. Conversely, if the content exceeds 0.1% by weight, the sintered article produced will show clear signs of lowered high-temperature strength because the amount of vitreous phase originating in the liquid phase formed in the process of sintering and remaining among the sinter particles will increase. It is, therefore, important to confine the content within the range mentioned above.

For the preparation of the mixture, either powdery compounds of $Al_2O_3$, $La_2O_3$, $LaAlO_3$, and $SiO_2$ or precursor compounds which yield such oxides when heated are used as the starting materials. As the silica which constitutes a trace component of the mixture, it is advantageous to use silicon alkoxides like tetraethyl silicate and colloidal silica in view of their amenability to homogeneous mixing. As the sources for alumina and lanthanum oxide, powdery materials are generally used. As the source for lanthanum oxide, it is particularly desirable to use $LaAlO_3$ powder. This is because $La_2O_3$ reacts readily with water and, when persisting in its unaltered form in the mixture, absorbs moisture to cause swelling of the shaped mixture. The raw materials, namely $Al_2O_3$, $La_2O_3$, $LaAlO_3$, $SiO_2$, etc. should best have a high purity of not less than 99.9%.

For mixing these raw materials, any of the conventional machines used for mixing or kneading powdery materials can be used. Though this mixing may be carried out in a wet or a dry process, it is desirably performed in the wet process. In the wet mixing, such solvents as water, methanol, ethanol, and toluene are usable. The mixing can be carried out effectively in water by adjusting the pH of the mixture in the range of from 3 to 5 as by dropwise addition of nitric acid and in an organic solvent by using such a dispersant as cationic cellulose. Further, in the mixing or kneading process, it is desirable to exercise such precautions as using balls made of high-purity alumina as a pulverizing medium and a container made of high-purity alumina or synthetic resin as a mixing vessel so that the amount of the impurities which pass from the balls and the vessel into the produced mixture and cannot be removed by heating can be limited to below 0.1% by weight.

This invention specifies use of raw materials of high purity and recommends use of balls made of high-purity alumina and a container made of high-purity alumina or synthetic resin in the process of mixing these raw materials in order to preclude the possibility that such impurities as alkali metals and alkaline earth metals entering the raw materials prior to or during the firing process will form a low-melting-point vitreous phase and markedly degrade the high-temperature properties of the sintered article produced. Commercially available high-purity alumina and lanthanum oxide raw materials generally contain silica at the rate of some tens of ppm. When such commercially available materials are used, therefore, it is difficult to keep the silica content of the mixture below 0.005% by weight (50 ppm), especially when additional silica is present at the site of the mixing process. It is, therefore, desirable to measure the amount of silica from the mixing environment before hand, as by emission plasma spectroanalysis, and then adjust the amount of silica to be added during the preparation of the mixture.

Then, the mixture of raw materials obtained as described above is formed into a desired shape by a casting or filter press wet molding technique or by provisionally drying the mixture by the spray dry technique, for example, and then dry molding the dried mixture by the conventional drying technique.

Subsequently, the shaped mixture is fired by the conventional firing method which comprises first calcining the mixture in the air at a temperature in the approximate range of from 600° C. to 1000° C. thereby thermally removing therefrom such extraneous substances as salts, dispersant, and resin admitted in the mixing process and thereafter firing the calcined mixture at a temperature in the range of from 1400° C. to 1800° C., preferably from 1500° C. to 1700° C., thereby densifying it. For the purpose of realizing high strength and high toughness in this case, it is necessary that the mixture be densified to a relative density of not less than 97% and the reaction between the raw materials be caused to proceed thoroughly until the sintered article forms a crystal phase consisting solely of $Al_2O_3$ and $LaAl_{11}O_{18}$. If the firing temperature is less than 1400° C., the sintered article produced will acquire low fracture toughness because the mixture cannot be densified to a relative density exceeding 97%, the residual pores will be a possible cause of rupture and bring about a decrease of strength, and the platelike crystals of $LaAl_{11}O_{18}$ will not be sufficiently formed. Conversely, if the firing temperature exceeds 1800° C., the particles of $Al_2O_3$ and $LaAl_{11}O_{18}$ will grow excessively to the extent of lowering strength. Thus, it is necessary that the firing be carried out in the temperature range mentioned above. Further, the relationship between the firing time and the firing temperature is such that the firing time should be lengthened when the firing temperature is low and shortened when the firing temperature is high. For the purpose of meeting the conditions mentioned above and realizing high strength and high toughness, however, it is advisable to carry out the densification for a period in the range of from 0.1 to 10 hours. The sintered article is characterized by the fact that the densification can be attained by ordinary pressure firing, which is easy to perform. Alternatively, the densification may be effected by hot pressing or HIP, for example.

Although an oxidative atmosphere is preferably used in the firing process, it is also allowable to carry out the firing process in a non-oxidative atmosphere (nitrogen gas or argon gas).

The sintered ceramic article of this invention obtained as described above and formed mainly of alumina possesses a microstructure having platelike lanthanum β-alumina particles dispersed in an alumina matrix formed of platelike particles. The microstructure having such intermixed platelike particles produces high toughness. Further, the different sorts of platelike particles dispersed in the microstructure mutually repress their abnormal grain growth, uniformize distribution of particle sizes, increase strength, do not permit persistence of any low-melting substance after sintering, and consequently promote high-temperature strength. This invention is therefore capable of producing a sintered ceramic article formed mainly of alumina and exhibiting such heretofore unattainable properties as high strength, high toughness, and high strength at elevated temperatures.

Prior to completing the invention, the inventors found that by the sole addition of a very small amount of $SiO_2$ to alumina, the particles of alumina which are in an isometric form in the absence of this addition grow in a platelike form. They also ascertained that the sintered article obtained from the mixture involving the sole addition of $SiO_2$ acquires an extremely heterogeneous texture having giant platelike alumina particles and minute platelike alumina particles mixed therein and, as a result, exhibits rather lower strength and fracture toughness than the sinter excluding the addition of $SiO_2$, as shown in Table 1 appearing later in this specification. Further, in the mixture involving the sole addition of $La_2O_3$, the improvement in the toughness of the sintered article is slight. This invention is characterized by the fact that high strength and high toughness unattainable by the sole addition of $SiO_2$ or $La_2O_3$ can be attained by simultaneous addition of $SiO_2$ and $La_2O_3$.

As clearly shown in Table 1, which summarizes the results obtained in the working examples and comparative examples described hereinbelow, when the raw materials fall in the content ranges specified by this invention, the sintered article produced assumes a crystal phase consisting of $Al_2O_3$ and $LaAl_{11}O_{18}$ and exhibits room temperature strength of not less than 500 MPa, high-temperature (1200° C.) strength of not less than 350 MPa, and fracture toughness of not less than 5 MPam$^{\frac{1}{2}}$.

This invention thus provides a sintered ceramic article which is formed mainly of alumina and exhibits high strength, high-temperature strength, and high toughness on a high level not attainable by the conventional sintered ceramic article formed mainly of alumina.

The sintered ceramic article according to this invention, which is formed mainly of alumina, can therefore be expected to find extensive utility as a structural material for use in corrosive environments which cannot be endured by conventional materials. It can also be expected to be adopted as an inexpensive high-temperature structural material for use in the place of refractory alloys and non-oxide ceramic materials. Specifically, the sintered ceramic article can be used in pumps, seals, nozzles, bearings and other mechanical components which require resistance to corrosion and resistance to abrasion, and also in heat-exchangers, engines, gas turbine components and other products which require resistance to heat. Further, in the field of electronic material parts, bioceramics and other functional materials, the sintered ceramic article of this invention can be expected to dramatically improve material reliability through increased toughness.

The invention will now be described specifically below with reference to working examples and comparative examples.

EXAMPLES 1 TO 7 AND COMPARATIVE EXAMPLES 1 TO 7

The procedures involved in these working examples and the comparative examples were identical except that the raw material powders used therein were varied in composition.

The procedure used was as follows.

A liquid silica dispersion was prepared by adding 250 μl of 1N nitric acid to a prescribed amount of tetraethyl silicate and stirring them together at 40° C. for 12 hours to make hydrolysis. In a planetary ball mill using balls made of high-purity alumina with an assay of 99.9% and a mixing vessel made of plastic resin, 32 cc of distilled water, the whole amount of the liquid silica dispersion and prescribed amounts of $Al_2O_3$ power and $LaAlO_3$ powder in the distilled water, and 2.5 cc of 1N nitric acid added thereto were together mixed for two hours. The $Al_2O_3$ powder had a purity of not less than 99.99% and a particle diameter of 0.2 μm and the $LaAlO_3$ powder had a purity of not less than 99.9% and a particle diameter of 0.5 μm. The total amount of these powders was about 70 g. The prescribed amounts mentioned above were such that the raw material compositions of the working examples and the comparative examples had the numerical values shown in Table 1 below. The raw material contents used in the working examples and the comparative examples are also shown in the table. The slurry consequently obtained was cast molded under a pressure of 4 kg/cm² to obtain a shaped plate measuring 60×50×7 mm. This shaped plate was dried for twenty-four hours in a constant temperature-constant humidity bath kept at a temperature of 50° C. and 50% RH. Then, it was calcined in the air at 800° C. for one hour to remove salts and the resin leaked from the mixing vessel. A sintered article (plate) was obtained by setting the calcined plate in an alumina crucible, heating it in the air at a temperature increasing rate of 10° C./min to 1600° C., and leaving it to stand at 1600° C. for two hours. The sintered article thus obtained was cut into test pieces measuring 3×4×40 mm. The test pieces were ground, tested for four-point bending strength at room temperature in accordance with Japanese Industrial Standard (JIS) R-1601, for high-temperature four-point bending strength at 1200° C. in accordance with JIS R-1604, and for fracture toughness by the SEPB method according to JIS R-1607. In consideration of the possible entry of impurities, particularly silica, during the mixing, forming, and firing processes of the mixture, the chemical composition of the sinter was determined by the emission plasma spectroanalysis (ICP method). The chemical analysis according to the ICP method revealed no other cationic impurities than Al, La, and Si. The results of the determination of mechanical properties, chemical composition, densities, and crystal phases for X-ray diffraction are shown in Table 1 together with the raw material contents. The numerical values of density shown in the table represent the magnitudes of relative density (%) based on theoretical density.

TABLE 1

| Sample | Raw material powder contents | | | Composition of produced sintered article by analysis | | | Relative denisty (%) | Deflection strength (MPa) | | Fracture toughness (MPam$^{\frac{1}{2}}$) | Composition of crystal phase |
| --- | --- | --- | --- | --- | --- | --- | --- | --- | --- | --- | --- |
| | $Al_2O_3$ (wt %) | $La_2O_3$ (wt %) | $SiO_2$ (ppm) | $Al_2O_3$ (wt %) | $La_2O_3$ (wt %) | $SiO_2$ (ppm) | | Room temperature | 1200° C. | | |
| Example 1 | 99.0 | 1.0 | 40 | 99.0 | 1.0 | 105 | 99.1 | 550 | 370 | 5.0 | $Al_2O_3, LaAl_{11}O_{18}$ |
| Example 2 | 99.0 | 1.0 | 920 | 98.9 | 1.0 | 985 | 99.0 | 530 | 360 | 5.5 | $Al_2O_3, LaAl_{11}O_{18}$ |
| Example 3 | 97.7 | 2.3 | 330 | 97.7 | 2.3 | 400 | 99.3 | 570 | 390 | 5.3 | $Al_2O_3, LaAl_{11}O_{18}$ |
| Example 4 | 95.4 | 4.6 | 530 | 95.3 | 4.6 | 600 | 99.2 | 670 | 440 | 5.4 | $Al_2O_3, LaAl_{11}O_{18}$ |
| Example 5 | 93.2 | 6.8 | 530 | 93.1 | 6.8 | 608 | 99.0 | 640 | 410 | 5.2 | $Al_2O_3, LaAl_{11}O_{18}$ |
| Example 6 | 90.1 | 9.9 | 50 | 90.1 | 9.9 | 110 | 98.0 | 550 | 380 | 5.0 | $Al_2O_3, LaAl_{11}O_{18}$ |
| Example 7 | 90.1 | 9.9 | 930 | 90.0 | 9.9 | 990 | 97.2 | 510 | 350 | 5.7 | $Al_2O_3, LaAl_{11}O_{18}$ |
| Comparative Example 1 | 100 | 0 | 0 | 100 | 0 | 56 | 98.9 | 470 | 290 | 3.6 | $Al_2O_3$ |
| Comparative Example 2 | 100 | 0 | 600 | 99.9 | 0 | 670 | 98.1 | 360 | 280 | 3.5 | $Al_2O_3$ |
| Comparative Example 3 | 100 | 0 | 850 | 99.9 | 0 | 937 | 98.8 | 410 | 270 | 3.8 | $Al_2O_3$ |
| Comparative Example 4 | 93.2 | 6.8 | 0 | 93.2 | 6.8 | 80 | 99.3 | 610 | 420 | 4.3 | $Al_2O_3, LaAl_{11}O_{18}$ |
| Comparative Example 5 | 95.4 | 4.6 | 1410 | 95.2 | 4.6 | 1500 | 99.1 | 470 | 260 | 5.8 | $Al_2O_3, LaAl_{11}O_{18}$ |
| Comparative Example 6 | 88.6 | 11.4 | 400 | 88.5 | 11.4 | 505 | 97.3 | 490 | 340 | 5.2 | $Al_2O_3, LaAl_{11}O_{18}$ |
| Comparative Example 7 | 88.6 | 11.4 | 1390 | 88.4 | 11.4 | 1510 | 98.2 | 470 | 280 | 5.8 | $Al_2O_3, LaAl_{11}O_{18}$ |

What is claimed is:

1. A sintered ceramic article formed mainly of alumina, having a chemical composition of from 1 to 10% by weight of $La_2O_3$, from 0.01 to 0.1% by weight of $SiO_2$, and the balance of $Al_2O_3$, and substantially comprising corundum (α-$Al_2O_3$) and lanthanum β-alumina ($La_2O_3 \cdot Al_2O_3$).

2. A sintered ceramic article according to claim 1, wherein the content of said $La_2O_3$ is in the range of from 3 to 7% by weight.

3. A sintered ceramic article according to claim 1, wherein the content of said $SiO_2$ is in the range of from 0.02 to 0.08% by weight.

4. A method for the production of a sintered ceramic article formed mainly of the alumina, which comprises shaping a mixture of $Al_2O_3$, $La_2O_3$, and $SiO_2$, calcining the shaped mixture in the air at a temperature in the range of from 600° C. to 1000° C., and further firing the calcined shaped mixture to a temperature in the range of from 1400° C. to 1800° C.

5. A method according to claim 4, wherein said mixture comprises from 1 to 10% by weight of $La_2O_3$, from 0.01 to 0.1% by weight of $SiO_2$, and the balance of $Al_2O_3$.

6. A method according to claim 4, wherein said firing is performed at a temperature in the range of from 1500° C. to 1700° C.

7. A method according to claim 5, wherein the content of said $La_2O_3$ is in the range of from 3 to 7% by weight.

8. A method according to claim 5, wherein the content of said $SiO_2$ is in the range of from 0.02 to 0.08% by weight.

9. A method according to claim 4, wherein the heating temperature for said firing is maintained for a period in the range of from 0.1 to 10 hours after the completion of said firing.

* * * * *